United States Patent
Donthireddy et al.

(10) Patent No.: US 12,164,489 B2
(45) Date of Patent: Dec. 10, 2024

(54) DATABASE PROVISIONING AND MANAGEMENT SYSTEMS AND METHODS

(71) Applicant: T-Mobile USA, Inc., Bellevue, WA (US)

(72) Inventors: Venkata Reddy Donthireddy, Sammamish, WA (US); Deependra Adhikari, Bellevue, WA (US); Praveen Kumar Indla, Bothell, WA (US); Madhu Raman Nair Kangara, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 6 days.

(21) Appl. No.: 17/740,160

(22) Filed: May 9, 2022

(65) Prior Publication Data

US 2023/0359600 A1    Nov. 9, 2023

(51) Int. Cl.
| | | |
|---|---|---|
| *G06F 16/00* | (2019.01) | |
| *G06F 11/30* | (2006.01) | |
| *G06F 11/34* | (2006.01) | |
| *G06F 16/21* | (2019.01) | |
| *G06F 16/23* | (2019.01) | |
| *G06N 5/022* | (2023.01) | |

(52) U.S. Cl.
CPC ........ *G06F 16/217* (2019.01); *G06F 11/3006* (2013.01); *G06F 11/3409* (2013.01); *G06F 16/2365* (2019.01); *G06N 5/022* (2013.01)

(58) Field of Classification Search
CPC ............... G06F 16/217; G06F 11/3006; G06F 11/3409; G06F 16/2365; G06N 5/022
See application file for complete search history.

(56) References Cited

U.S. PATENT DOCUMENTS

| | | |
|---|---|---|
| 7,233,933 B2 | 6/2007 | Horvitz et al. |
| 9,699,049 B2 | 7/2017 | Gupta et al. |
| 10,339,150 B1 | 7/2019 | Silk et al. |

(Continued)

FOREIGN PATENT DOCUMENTS

| | | |
|---|---|---|
| CN | 111627533 B | 2/2022 |
| EP | 2820490 B1 | 1/2020 |

(Continued)

*Primary Examiner* — Paul Kim
(74) *Attorney, Agent, or Firm* — Perkins Coie LLP

(57) ABSTRACT

A system and methods for provisioning and managing databases are disclosed. A request is received to provision a database for a software application, including a general database type and one or more parameters for the requested database. Based on the received request, the system generates database recommendations including a recommended specific type of database. The system receives a selection of one of the recommended databases and determines whether a user submitting the request is approved, based on a level of privileges or a quota. When the user is approved for the selected database, the system generates the selected database by retrieving database code from a repository. The system updates an inventory to reflect the provisioning of the generated database. The generated database can then be managed using the system, including predicting adverse events associated with the generated database and/or predicting a need to adjust resources for the generated database.

20 Claims, 6 Drawing Sheets

(56) References Cited

U.S. PATENT DOCUMENTS

| | | |
|---|---|---|
| 10,452,463 B2 | 10/2019 | Hiran et al. |
| 10,455,363 B2 | 10/2019 | Liang et al. |
| 10,642,719 B1 | 5/2020 | Balasubramanian et al. |
| 10,708,151 B2 | 7/2020 | Dixon et al. |
| 10,937,089 B2 | 3/2021 | Nandan et al. |
| 11,036,700 B2 | 6/2021 | Huang et al. |
| 11,049,058 B2 | 6/2021 | Aasoori et al. |
| 11,061,902 B2 | 7/2021 | Idicula et al. |
| 11,086,643 B1 | 8/2021 | Sharma et al. |
| 11,095,573 B2 | 8/2021 | Pargaonkar et al. |
| 11,106,996 B2 | 8/2021 | Fieres et al. |
| 11,144,835 B2 | 10/2021 | Anagnostou et al. |
| 11,194,809 B2 | 12/2021 | Buda et al. |
| 11,216,580 B1 | 1/2022 | Holboke et al. |
| 11,227,239 B2 | 1/2022 | Beynel et al. |
| 11,250,364 B2 | 2/2022 | Beznos et al. |
| 11,270,785 B1 | 3/2022 | Talvola et al. |
| 2017/0005904 A1* | 1/2017 | Sharma ............... G06F 11/3409 |
| 2017/0178080 A1 | 6/2017 | Abebe et al. |
| 2017/0286622 A1 | 10/2017 | Cox et al. |
| 2019/0286541 A1* | 9/2019 | Sobala ............... G06F 11/3447 |
| 2020/0065772 A1 | 2/2020 | Whitehead et al. |
| 2020/0160211 A1 | 5/2020 | Kumar et al. |
| 2020/0204431 A1 | 6/2020 | Bahrami et al. |
| 2020/0250548 A1* | 8/2020 | Shwartz ............... G06N 5/045 |
| 2020/0285642 A1 | 9/2020 | Bei et al. |
| 2020/0410001 A1 | 12/2020 | Sarkissian |
| 2021/0004712 A1 | 1/2021 | Sarferaz |
| 2021/0007659 A1 | 1/2021 | Shugg et al. |
| 2021/0019246 A1 | 1/2021 | Ramage |
| 2021/0070336 A1 | 3/2021 | Howard et al. |
| 2021/0124739 A1 | 4/2021 | Karanasos et al. |
| 2021/0132947 A1 | 5/2021 | John et al. |
| 2021/0133622 A1 | 5/2021 | Nidd et al. |
| 2021/0133632 A1 | 5/2021 | Elprin et al. |
| 2021/0149384 A1 | 5/2021 | Dittmer et al. |
| 2021/0186368 A1 | 6/2021 | Kawecki et al. |
| 2021/0192057 A1 | 6/2021 | Helfman et al. |
| 2021/0240692 A1 | 8/2021 | De Oliveira et al. |
| 2021/0250253 A1* | 8/2021 | Finkelstein ......... H04L 67/1097 |
| 2021/0319008 A1 | 10/2021 | Dharmalingam et al. |
| 2022/0019496 A1 | 1/2022 | Lozano et al. |
| 2022/0036156 A1 | 2/2022 | Brutsche et al. |
| 2022/0036253 A1 | 2/2022 | Brutsche et al. |
| 2022/0103589 A1 | 3/2022 | Shen et al. |
| 2022/0107788 A1 | 4/2022 | Beck et al. |
| 2022/0129907 A1 | 4/2022 | Mustafi et al. |
| 2022/0138199 A1 | 5/2022 | Idicula et al. |
| 2023/0126997 A1* | 4/2023 | Mehta ................... G06F 16/285 707/740 |

FOREIGN PATENT DOCUMENTS

| | | |
|---|---|---|
| EP | 3346379 B1 | 3/2020 |
| EP | 3688614 A1 | 8/2020 |
| EP | 3695349 A1 | 8/2020 |
| EP | 3776376 A1 | 2/2021 |
| WO | 2019113122 A1 | 6/2019 |
| WO | 2020053778 A1 | 3/2020 |
| WO | 2020097221 A1 | 5/2020 |
| WO | 2020210666 A1 | 10/2020 |
| WO | 2020234902 A1 | 11/2020 |

\* cited by examiner

DATABASE PROVISIONING AND MANAGEMENT SYSTEMS AND METHODS

BACKGROUND

Databases are an integral part of many software application ecosystems. Organizations use and manage different kinds of databases for various purposes and applications. Database management can include selecting and building databases, provisioning databases, maintaining database inventories, monitoring databases and assessing database performance, modifying or updating databases, and so forth. Databases can be hosted on-premises and/or on the cloud.

BRIEF DESCRIPTION OF THE DRAWINGS

Detailed descriptions of implementations of the present invention will be described and explained through the use of the accompanying drawings.

Figure 1:
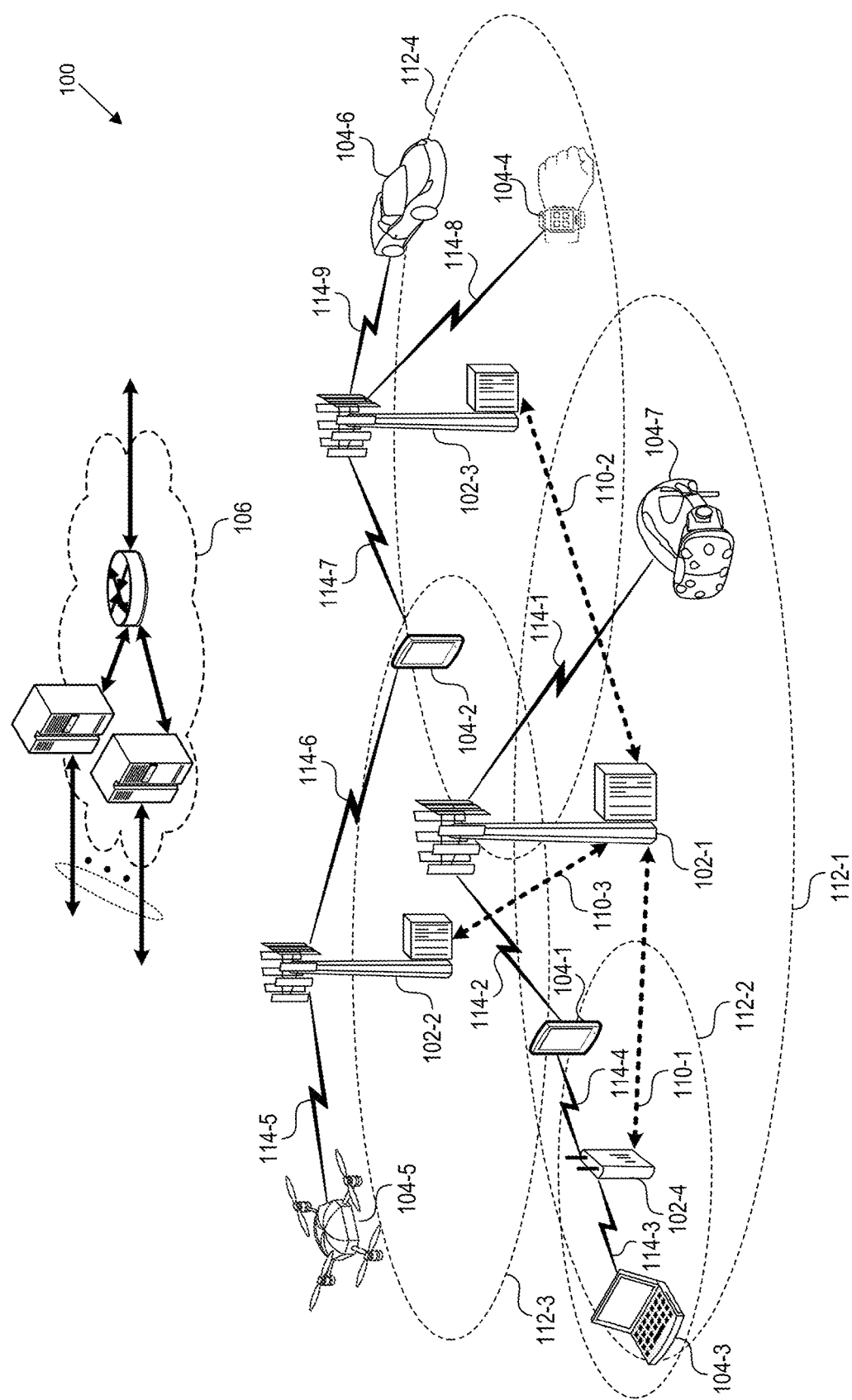
FIG. 1 is a block diagram that illustrates a wireless communications system that can implement aspects of the present technology in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Organizations, such as telecommunication service providers, manage and use large numbers of databases, such as thousands or tens of thousands of databases, via which a wide variety of data can be hosted. For example, a telecommunication service provider can use databases to maintain data related to subscribers, payments, employees, transactions or orders, business activities, telecommunication services (e.g., call detail records), telecommunication networks, network or web traffic, supply chains, products, stores, devices, telecommunication infrastructure, and so forth. Database administrators and/or developers select from different kinds of available databases based on various factors related to specific database deployments and/or data that will be stored in and retrieved from the databases. These factors can include, for example, data type or format (e.g., structured or unstructured), amount of data, projected growth, archiving criteria, schema design (e.g., fixed or flexible), ingestion rate, frequency of data retrieval, expected duration of storage, format of data, data security, database performance, ease of monitoring and maintenance, cost, ease of database provisioning or creation, ease of data search and retrieval, application use case scenarios, scalability (horizontal or vertical), backup and recovery needs, and so forth. The general types of databases from which a telecommunication service provider may select include centralized databases, cloud-based databases, commercial databases, open-source databases, distributed databases, end-user databases, graph databases, NoSQL databases, relational and/or object-oriented databases, personal databases, in-memory databases, document-based databases, time series databases, wide column databases, key value databases, search databases, cache databases, and so forth. The foregoing examples of database types are non-limiting and may not be mutually exclusive—e.g., a database can be both commercial and cloud-based, or both relational and open-source, etc.

Telecommunication service providers face difficult technical challenges related to provisioning, creating, and/or managing databases. Existing systems for provisioning and managing databases typically offer limited features, and such systems are often specific to a vendor or a specific type of database. For example, Apache Cassandra database system is installed, managed, and monitored using DataStax OpsCenter platform, whereas MongoDB database system is installed, managed, and monitored using Ops Manager platform, and so forth. Thus, existing systems may require database administrators to learn and use multiple platforms to provision and manage various kinds of databases. Additionally, existing systems typically require application developers to manually submit requests for database administrators to provision databases based on various requirements and other considerations, which can be inefficient and time-consuming. Existing systems also do not allow for consideration of enhanced insights and considerations when selecting a database, such as access patterns or dynamic workload characteristics. Access patterns can include various ways in which systems, users, or processes access data. Examples of access patterns include excessive-read/minimal write, excessive write/minimal read, limited interaction (e.g., only interacting with limited datasets in a database), complex join (e.g., interacting with multiple other databases), simple access (e.g., selecting from a limited table), composite (e.g., accessing data from different distributed databases), time-bound (e.g., only accessing data from the previous 24 hours, 48 hours, 36 hours, etc.), and so forth. Workload characteristics can relate to a type of payload that a user, system, or process will generate against a database. Examples of workload characteristics include online transactional processing (OLTP), online analytics transaction processing (OLAP), and analytical workload. In addition, existing systems do not provide a central platform by which application developers can generate their own databases, rather than having database administrators generate the databases for them. Furthermore, existing systems for monitoring databases typically do not use predictive models to predict and correct for events, such as resource adjustments or adverse events (e.g., outages). These and other shortcomings of existing systems can result in selection of an unsuitable database type for a particular implementation, inefficient use of computing and/or network resources, increased costs to provision and manage databases, unnecessary outages or other performance issues, and other problems. Additionally, existing systems can result in generation of duplicative databases because existing systems do not provide an automatic check to see if a proposed database already exists.

Accordingly, there is a need for technologies that overcome the foregoing problems and provide other benefits. For example, there is a need for a central platform via which a wide variety of database types can be provisioned and/or managed automatically, with minimal to no user interaction/guidance required. Additionally, there is a need for a system that can generate database recommendations based on various factors related to a database deployment, such as amount and type of data, data security, schema design, access patterns, database complexity, data formatting requirements or preferences, database cost, database reliability, and so forth. And there is a need for a system that predicts events based on monitoring data for a database, such as predicting outages based on detecting anomalies in the monitoring data and automatically provisioning resources for a database based on detecting capacity issues and/or patterns in usage, performance, and so forth.

Disclosed herein are systems and related methods for provisioning and managing databases ("system" or "database management system"). The system receives a request to provision a database, such as a request from an application developer for a database to be used by a software application. The request includes parameters for the requested database, such as one or more requirements statements and a type and amount of data to be stored in the database. The parameters include a general database type (e.g., cache, relational, object-oriented), an application with which the database will be associated, and an initial size of the database. Based on the request, the system generates one or more database recommendations that include a specific type of database that can be generated. The system then receives a selection of a database from the one or more database recommendations. Using a set of rules, the system approves or disapproves the selected database. If the selection is approved, then the system automatically builds and deploys the selected database, such as by retrieving code from a repository. Once the database has been deployed, the system can monitor and manage the database. Monitoring and managing the database can include, for example, applying a machine learning model to predict one or more events, such as an outage or other performance problem. Additionally or alternatively, the system can automatically detect that the database is approaching capacity and automatically adjust resources for the database.

To facilitate monitoring and management of databases, the system trains one or more machine learning models to predict events associated with databases. An event can be an adverse event, such as an outage or performance problem. Additionally or alternatively, an event can be a modification of a database, such as a resource adjustment to add capacity to a database (e.g., increase storage or processing capability). The events are predicted based on detecting anomalies or other patterns in monitoring data for databases. The system trains one or more machine learning models using one or more training datasets comprising monitoring data for multiple databases, as described in additional detail herein.

Advantages of the disclosed system include improved and early detection of, and/or correction for, events that can negatively impact database performance, such as outages, slowdowns, capacity issues, compatibility issues, and so forth. Additionally, the disclosed system generates database recommendations and provisions databases based on the recommendations, which improves over manual/existing processes for gathering requirements, generating recommendations, and provisioning databases. Furthermore, the disclosed system provisions and manages various kinds of databases via a single control pane, rather than requiring the use of various vendor-specific and/or administrator-facing platforms for provisioning and managing databases. This results in efficiencies related to gathering requirements, obtaining approvals, managing inventories, reducing database build times, provisioning hosts, and so forth. In general, the disclosed system leads to a faster time to market by reducing idle and waiting time associated with database provisioning.

Although examples are described herein related to provisioning and management of databases for a telecommunications service provider, a person skilled in the art will appreciate that the disclosed technology can be used in any context where databases are provisioned, monitored, and/or managed.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Database Management System

Figure 2:
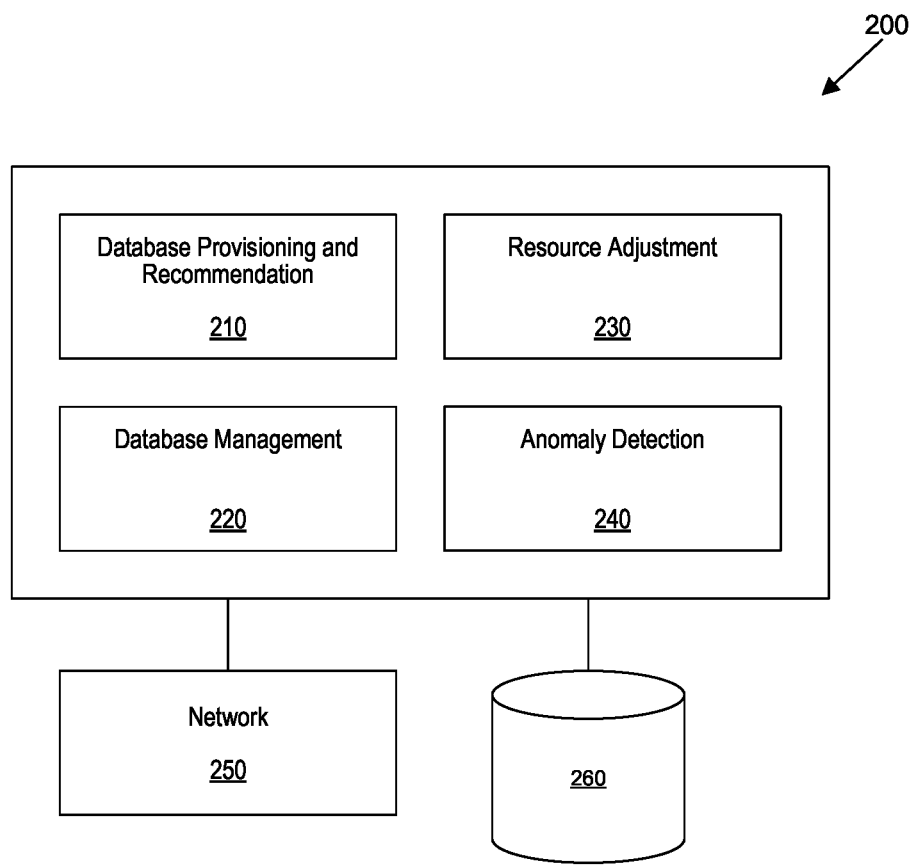
FIG. 2 is a block diagram that illustrates components of a database provisioning and management system in some implementations.

FIG. 2 is a block diagram that illustrates components of a database management system 200 that provisions, monitors, and/or manages databases in some implementations. All or portions of the system 200 can be provided, for example, by a telecommunications service provider that provides all or portions of the network 100 and using one or more components of the network 100. The database management system 200 can include functional modules that are implemented with a combination of software (e.g., executable instructions or computer code) and hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The database management system 200 includes a database provisioning and recommendation module 210, a database management module 220, a resource adjustment module 230, and an anomaly detection module 240, each of which are discussed separately herein below. These and other modules of the system 200 access data, such as database monitoring data and/or training datasets, via a network component 250 and/or a storage component 260. The network component 250 is configured to communicate with external devices or entities, such as devices to which databases are being provisioned and/or devices via which data is accessed by the system 200. The storage component 260 comprises local storage, storage on a server system or on the cloud, or a combination thereof. The storage component 260 stores data for or used by the system 200, such as data related to databases provisioned, monitored, and/or managed using the system 200 and/or training datasets used by the system 200.

Database Provisioning and Recommendation Module

The database provisioning and recommendation module 210 receives requests to provision databases, generates database recommendations based on the received requests, and provisions databases. In some implementations, the database provisioning and recommendation module 210 includes one or more interfaces, such as graphical user interfaces (GUIs), via which requests to provision databases are received. The database provisioning and recommendation module 210 receives a request to provision a database, such as for a software application. The database provisioning request specifies parameters including a general database type, an application with which the database will be associated, and an initial size for the database. Alternatively, the database provisioning request can specify application parameters, such as an application and one or more application requirements (e.g., data type, expected amount of data, data format, etc.). Additional parameters for the requested database can include a problem statement or requirements statement, one or more data types to be hosted by the database, an amount of data to be hosted by the database, software code for the software application that will use the database, availability requirements, disaster recovery or resiliency requirements, potential growth patterns (e.g., spikes or short-term load increases), data or application sensitivity, access patterns, workload characteristics, and/or required or preferred analytics, dashboards, or reporting for the database.

Parameters included in the database provisioning request can be received in various ways, such as receiving parameters as a series or set of selections of sub-parameters in JavaScript Object Notation (JSON) format. In some implementations, parameters can include complex and/or compound parameters, such as a database type and a database version received and/or processed as a single parameter value. In some implementations, at least some parameters can have a default value and/or parameter values can be extrapolated when no value is specified in a request (e.g., based on one or more other parameters). In some implementations, the database provisioning and recommendation module 210 can process one or more received parameter values before making a recommendation, such as by identifying a matrix of a recommended target database type based on received parameters and/or various criteria associated with a database recommendation. In some implementations, the database provisioning and recommendation module 210 can make recommendations related to peripheral requirements, such as one or more environments where the database is to be deployed. In these and other implementations, the database provisioning and recommendation module 210 can recommend a target state database architecture based on configurable settings. For example, a user or administrator can configure settings defining different types of environments (e.g., production, development, test, etc.) and associated infrastructure where a database will be deployed, based on received parameters. Using these settings, the database provisioning and recommendation module 210 can determine, for instance, that parameters received in a request specify a net new application for which no associated databases exist, and the module 210 can recommend a development database, a test database, and a production database, which may be deployed in different environments and/or using different infrastructure. In these and other implementations, the database provisioning and recommendation module 210 can generate a different recommendation when a received request specifies an existing application, such as a recommendation to deploy a database in an existing environment and/or using existing infrastructure. Additionally or alternatively, configured settings can be used to automatically build geographically redundant database systems based on a determined criticality of an application (e.g., for mission-critical applications or systems).

Based on the parameters received in the database provisioning request, the database provisioning and recommendation module 210 generates one or more recommendations of databases to be provisioned. The recommendations can include a specific type of database system to be used, such as Apache Cassandra®, Microsoft Azure, MySQL, MongoDB, Redis, Amazon Web Services (AWS), or Couchbase. The recommendation can also include additional details about a database to be provisioned by the system 200, such as whether the database will be on-premises or on the cloud, an amount of storage or memory, an amount of processing capacity (e.g., virtual central processing units (vCPUs)), and so forth. Generating a recommendation of a database to be provisioned is discussed in additional detail with reference to FIG. 6 below. The database provisioning and recommendation module 210 receives a selection of a database to be provisioned from the one or more database recommendations, and the database provisioning and recommendation module 210 determines whether the selected database is approved for provisioning. For example, the database provisioning and recommendation module 210 can initiate an approval workflow using an orchestration engine that automatically determines whether the selected database can be provisioned based on privileges and/or quotas for the user that submits the request. A quota can be assigned to a group or a user based on various user characteristics, such as current and/or projected resource consumption. A user or group can be assigned an initial or default quota as a part of being onboarded to the system. The quota can include one or more of a processing capacity (e.g., 100 CPU, 200 CPU, 300 CPU, etc.), an amount of RAM (e.g., 200 GB, 500 GB, 700 GB, etc.), and/or an amount of storage (e.g. 100 TB, 200 TB, 300 TB, etc.). This quota can be fixed or adjustable/configurable. For example, the quota can automatically increase over time based on database growth or system utilization. Additionally or alternatively, a quota can be decreased or maintained if further database growth is found to be unsustainable and/or is likely to negatively impact other users.

If the selected database is approved, then the database provisioning and recommendation module 210 provisions and deploys the selected database. For example, a JavaScript Object Notation (JSON) payload can be generated that includes the characteristics of the selected database and/or parameters included in the request, and a deployment engine can receive the JSON payload and automatically build the selected database using database code retrieved from a repository. To provision and deploy the selected database, the database provisioning and recommendation module 210 can use Red Hat Ansible Automation Platform and/or Terraform. In some implementations, the database provisioning and recommendation module 210 can provide a combined deployment of both application code and database code. Once the selected database has been built, information about the database is added to an inventory for monitoring, and the database is deployed in an environment. The deployed database can then be managed using the database management module 220.

In some implementations, the database provisioning and recommendation module 210 can receive other kinds of requests, such as requests to decommission, upgrade, or modify an existing database. Database decommissioning can occur, for example, in response to a user-generated or system-generated request to decommission a database, or automatically in response to detecting that an application associated with a database has been retired. In these and other implementations, an owner associated with a database or application provides an indication that decommissioning of the database is approved. The disclosed system can then generate and store a final backup of data associated with the database (e.g., based on one or more configurable policies associated with data backup), and the database is taken offline. System resources associated with the decommissioned database are then released and reclaimed, and an inventory is updated to indicate that the database has been decommissioned.

A request to upgrade or modify a database can comprise a target version of a database (e.g., a version upgrade or patch update), which is received by the database provisioning and recommendation module 210. In response to receiving the request to upgrade or modify, the disclosed system then upgrades or modifies the database to the target version.

Database Management Module

The database management module 220 monitors, manages, and/or facilitates management of databases, such as databases provisioned using the database provisioning and recommendation module 210. The database management module 220 can include an operational control pane via which database health, database performance, and/or financial health associated with a database is monitored and analyzed. Additionally, the database management module 220 can utilize one or more models generated and/or stored by the resource adjustment module 230 and/or the anomaly detection module 240 to perform actions based on predicted events, such as outages or capacity issues. The database management module 220 can also include a discovery engine via which various details about databases can be tracked, such as historic performance and monitoring data, processing capacity, storage and/or memory, configuration details, users associated with databases, and so forth.

The operational control pane of the database management module 220 monitors various metrics associated with databases, such as usage, performance, speed, outage information, financial information associated with the database and so forth. Additionally, the operational control pane provides various analytical tools to facilitate management of the database. For example, the database management module 220 can provide reports and/or interfaces to indicate a current health or performance level of the database. In some implementations, the database management module 220 also provides information related to the cost of managing and hosting databases based on factors such as: the cost per unit of running underlying hardware (e.g., memory, storage, processors, network resources, etc.) that the database is consuming, annual licensing cost for the database and operating systems software extrapolated for the particular database's size and consumption, labor cost of managing the database and infrastructure cost, and so forth. Thus, the database management module can provide a monthly or annual cost of running each database.

The discovery engine of the database management module 220 provides details about various databases managed using the system 200, such as inventory information, users associated with databases, processing capacity for databases (e.g., vCPUs), memory and/or storage associated with databases, and configuration details. The discovery engine also provides historic information about databases managed using the system 200, such as historic performance or health of the database, information about decommissioned databases, and so forth. The discovery engine can further generate various metrics.

The database management module 220 can also modify databases, such as by automatically scaling capacity of a database and/or repairing errors or problems associated with a database. For example, the database management module 220 can predict a need to adjust a resource for a database, such as by providing additional processing capacity and/or memory or storage using the resource adjustment module 230, as will be described in additional detail herein. Upon predicting the need for the resource adjustment, the database management module 220 can automatically provide the additional resource. Additionally or alternatively, the database management module 220 can predict an adverse event associated with a database, such as an outage or performance issue, using the anomaly detection module 240. In response to predicting the adverse event, the database management module 220 can take actions to prevent and/or remedy the adverse event. For example, a database that has historically exhibited average growth of ~100 GB of storage per month can experience a sudden spike of 50 GB of storage in a short time (e.g., one hour, two hours, etc.), which could quickly consume all allocated space for the database. The database management module 220 can detect this spike (e.g., using a model provided by the resource adjustment module 230 and/or the anomaly detection module 240) and take one or more actions to prevent an outage, such as adding additional storage capacity for the database and identifying one or more users or processes that are causing the spike. The one or more users or processes can be denied access to the database to prevent additional spikes in storage.

Resource Adjustment Module

The resource adjustment module 230 trains/generates/provides one or more models that can be used to adjust resources for databases, such as databases provisioned using the database provisioning and recommendation module 210 and/or managed using the database management module 220. Resources that can be adjusted by the system 200 include processing capacity (e.g., vCPUs), memory, and/or storage. The one or more models provided by the resource adjustment module 230 can include machine learning models that are trained to predict a need for resource adjustments based on monitoring data from a database. These predictions can be recurring or non-recurring and at regular or irregular time intervals, and they can be associated with temporary or permanent adjustments of resources. For example, the resource adjustment module 230 can provide a model to predict a temporary need for additional capacity during a particular holiday when database activity is predicted to increase, and the model can predict an amount of resources that require adjustment, such as an additional amount of processing capacity and/or storage and a period of time during which the adjustment is needed. Additionally or alternatively, a model can predict the need for permanent or long-term increases in capacity at regular intervals based on historic usage data and/or history of manual resource adjustments. A model can also predict a need to add horizontal capacity (e.g., for a NoSQL database) based on one or more new feature releases for an application. The new feature can be a feature that will increase capacity needs, and the resource adjustment module 230 can predict a need for adding new hosts (e.g., nodes/operating system layers) to serve additional resource capacity needs of the application to increase the number of partitions or shards.

Anomaly Detection Module

The anomaly detection module 240 trains/generates/provides one or more models that can be used to predict adverse events associated with databases and take actions based on these predictions, such as actions to prevent or remedy the adverse events. An adverse event can be, for example, an outage of at least a portion of a database, a period of slow performance, and so forth. The anomaly detection module 240 provides one or models that can analyze historic monitoring data preceding adverse events to detect patterns or other indicators that an adverse event will happen. These patterns or indications can include, for example, a large amount of reads (e.g., hundreds, thousands, tens of thousands, hundreds of thousands) from new or unknown users, a large amount of reads or writes during an unusual time period (e.g., reads/writes for a retail payments database outside of store hours), database accesses from out-of-range IP addresses, error logs showing unusual errors and/or counts, storage array block errors, and so forth. Based on this analysis, the model is trained to predict the likelihood that adverse events will happen in the future using monitoring data for databases. Furthermore, based on these predictions, the anomaly detection module 240 can recommend and/or cause performance of one or more actions to prevent or remedy the predicted adverse event, such as adjusting resources, prohibiting database access by one or more users and/or generating security alerts, disabling at least a portion of a database, generating alerts or notifications, causing a database to failover to secondary nodes or different regions, evicting a node from a cluster group, and so forth.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the resource adjustment module 230 and/or the anomaly detection module 240 can include a neural network with multiple input nodes that receive training datasets. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to predict a need to adjust database resources and/or predict adverse events based on data anomalies, and so forth. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new telecommunication assets.

Database Provisioning

Figure 3:
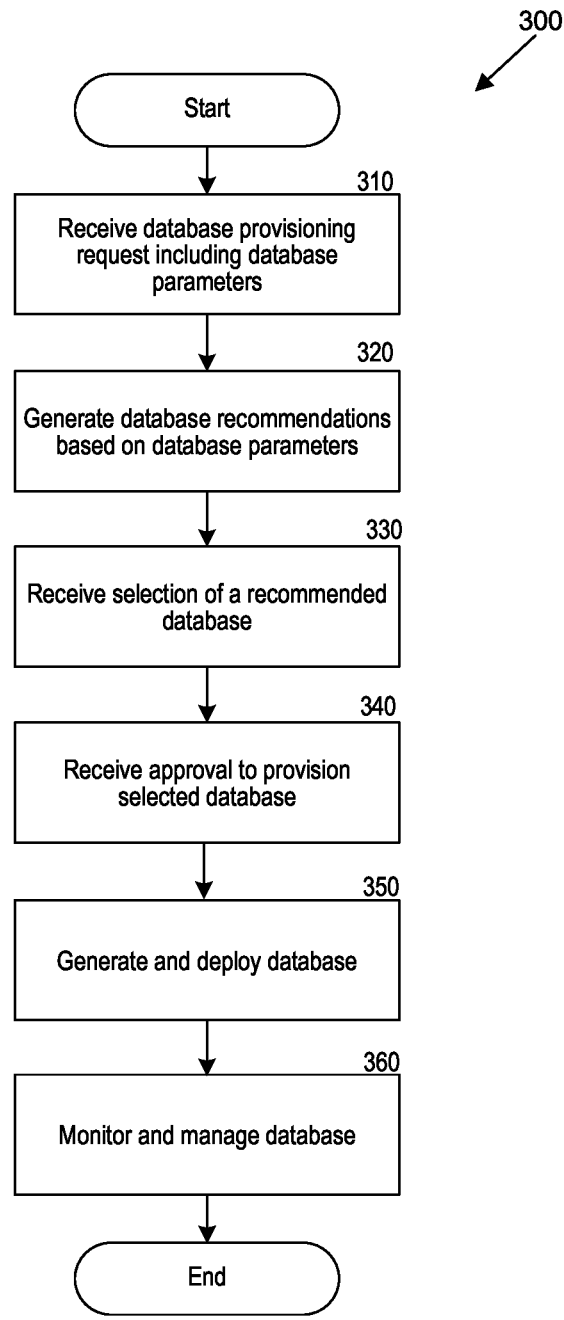
FIG. 3 is a flow diagram that illustrates a process to deploy and manage a database using a database provisioning and management system in some implementations.

FIG. 3 is a flow diagram that illustrates a process 300 to provision a database using a database provisioning and management system in some implementations. At least a portion of the process 300 can be performed using the database provisioning and recommendation module 210 of FIG. 2 and/or using at least one component of the network 100 of FIG. 1.

The process 300 begins at block 310, where a database provisioning request is received describing a requested database and including one or more parameters of the requested database. The database provisioning request can be associated with a software application that is being developed. The request can be received from a user device and via a GUI provided by the database management system. The one or more parameters include a general database type, an application with which the database will be associated, and/or an initial size (e.g., storage capacity) for the database. In some implementations, the one or more parameters further include a problem statement or requirements statement, a type of data, an amount of data, reporting/dashboarding/analytics needs or preferences, software code for an application, data format or schema design, high availability requirements, disaster recovery or resiliency requirements, potential growth patterns (e.g., potential for spikes or short-term load increases), sensitivity of an application or data (e.g., whether data includes Sarbanes Oxley (SOX) and/or Payment Card Industry (PCI) data, and so forth.

The process 300 then proceeds to block 320, where one or more recommendations are generated for databases that can be provisioned using the database management system. The one or more recommendations can be displayed to a user via a GUI. The database recommendations are generated based on the parameters included in the database provisioning request received at block 310. The recommendation includes a specific type of database to be provisioned, such as Apache Cassandra®, Microsoft Azure, MySQL, MongoDB, Redis, Amazon Web Services (AWS), or Couchbase. The recommendation also includes one or more characteristics of the database, such as an amount of memory and/or storage and processing capacity (e.g., vCPUs). In some implementations, the recommendation can include a database deployment topology, a recommendation for high availability and/or resiliency, a network zone placement (e.g., based on data type classification), and so forth.

The process 300 then proceeds to block 330, where a selection is received of a database from the one or more recommended databases. The selection can be received, for example, by detecting a user click via a GUI that displays the one or more recommendations. In response to receiving the selection, a JavaScript Object Notation (JSON) payload is generated that includes the characteristics of the selected database and/or parameters included in the request received at block 310

The process 300 then proceeds to block 340, where approval is received to provision the selected database. For example, an approval workflow can be triggered in response to the selection of the database, and an orchestration engine can determine whether to approve provisioning of the selected database based on various factors, including quota and/or privilege information associated with a user who submits the request. As described herein, a quota can be assigned to a team/group/user and stored within a database. This database will also have information about the approvers needed to allow the database provisioning. The orchestration engine will receive the approvals either via a user interface or through emails. The received approvals can update a provisioning runtime table, update a flag, and so forth. Approval is based on the available quota/entitlement and responses received via the user interface and/or via email from the approvers specified in the database. If the request is not approved (e.g., no action or rejection), then the process will end and a message will be displayed with information about the disapproval (e.g., indicating "rejection," "awaiting approval status," or another status).

The process 300 then proceeds to block 350, where the selected database is generated and deployed. A deployment engine receives the JSON payload generated at block 330 and automatically builds the selected database using database code retrieved from a code repository. Additionally, based on the JSON payload, servers/hosts are built and/or provisioned and a database engine is installed. Furthermore, configurations parameters are applied, monitoring and backups rules created, database details are added to an inventory, and one or more notifications are generated (e.g., to inform a user or requester that the database has been provisioned and to provide connectivity details for the database). The database can be provisioned, for example, using Red Hat Ansible Automation Platform and/or Terraform. In some implementations, a combined deployment can be performed using both application code and database code.

The process 300 then proceeds to block 360, where the deployed database is monitored and managed. Managing the database can include adding the database to an inventory of databases and monitoring the database for performance, health, financial performance, and so forth. To monitor and/or manage the database, a monitoring agent is generated (e.g., residing on each database host) to capture database metrics. The system can capture these metrics in JSON format (e.g., session details, blocking details, transaction throughput, input/output operations per second (IOPS), long-running sessions, etc.). The database metrics can be provided and/or displayed in various ways, such as via a dashboard or interface provided by the disclosed system for monitoring of database performance. The dashboard can provide various performance metrics and/or graphical views of performance data (e.g., charts, graphs, etc.). Additionally or alternatively, data and/or metrics captured by the monitoring agent can be compiled into various reports, such as system utilization reports, capacity trending reports, error reports, availability reports, and so forth. Data (e.g., raw data) can also be provided to a user for download as a delimited file and/or in JSON format. In some implementations, data collected by one or more monitoring agents is stored in a centralized database. In these and other implementations, the data and/or metrics captured by the one or more monitoring agents is collected as a stream and/or at regular intervals (e.g., hourly, daily, weekly, monthly, etc.), which can be configurable by a user.

The one or more monitoring agents can be customizable to capture any metrics that are available from a particular Database Management System, such as by invoking one or more APIs and/or by reading through systems/data dictionary views. To manage database lifecycles, the disclosed system can also capture activities that have occurred within the database, such as patching, change deployment, database configuration/parameter changes, user permission changes, and so forth.

The disclosed system (e.g., using a monitoring agent) detects current issues by analyzing database logs, monitoring agent parameters, database metadata table, and so forth. Based on the monitoring agent and one or more defined thresholds, alerts or notifications can be generated and sent (e.g., to emails, Slack, xMatter, Pager Duty, etc.).

Managing the database can also include facilitating change management, automatically adjusting resources of a database based on predicting a need for additional capacity (e.g., using a machine learning model provided by the system), and/or predicting and correcting for an adverse event based on detecting anomalies in monitoring data (e.g., using a machine learning model provided by the system). To facilitate monitoring and management, the disclosed system will contain APIs that can be consumed by other enterprise systems. For example, to facilitate change management, the disclosed system provides APIs that analyze database audit logs and other change management systems (CI/CD tools such as Gitlab, Liquibase, etc.) and provide a centralized view of all changes that have taken place within the database.

In some implementations, the process 300 can additionally or alternatively include processing other kinds of requests (e.g., received at block 310). For example, requests can be received and processed to add an additional node/host to an existing cluster, change resource capacity (e.g., add vCPU, add RAM, etc.), remove a node/host from a cluster group, failover to secondary databases, allow an in-place upgrade of a database to a newer version, and so forth.

In some implementations, the process 300 can include processing requests and/or generating recommendations associated with end-of-life database versions (e.g., when a threshold number of errors are detected) and/or associated with decommissioning a database. Decommissioning can occur, for example, when an application is marked as retired or when a system or a user explicitly requests the database be decommissioned. In response to the request and/or retirement of the application, an owner of the database is informed, and approval is received from the owner to decommission. A final backup of the database can be generated and stored in accordance with a backup policy (e.g., a user-configurable policy). The database is then dropped/taken offline, resources associated with the database are released/reclaimed, and an inventory is updated to indicate the decommissioning of the database.

Machine Learning Model Training

Figure 4:
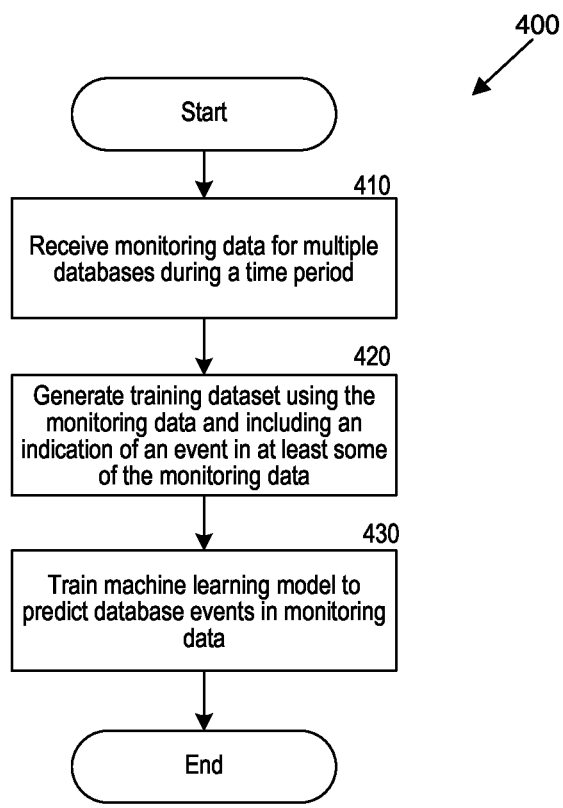
FIG. 4 is a flow diagram that illustrates a process to train a machine learning model to predict events based on monitoring data for a database in some implementations.

FIG. 4 is a flow diagram that illustrates a process 400 to train a machine learning model to make predictions based on monitoring data for a database in some implementations. At least a portion of the process 400 can be performed, for example, using the resource adjustment module 230 and/or the anomaly detection module 240. The machine learning model trained using the process 400 can be a machine learning model to predict a need for a resource adjustment for a database. Additionally or alternatively, the machine learning model can be a model to predict an adverse event (e.g., an outage or performance problem) and/or one or more actions to prevent or remedy the adverse event.

The process 400 begins at block 410, where monitoring data is received for multiple databases during an analyzed time period during which at least some of the multiple databases experienced an event. The event can be an adjustment of resources, such as an increase in processing capacity, memory, or storage for the database. Additionally or alternatively, the event can be an adverse event, such as an outage or a period of slow performance. The received data can represent all monitoring data (e.g., system logs) for one or more databases during an analyzed time period (e.g., one day, one week, one month, three months, six months, etc.). The data can include database query execution plans. Monitoring data can be received in various formats, such as JSON format.

The process 400 proceeds to block 420, where a training dataset is generated using the received monitoring data for the multiple databases. Generating the training dataset can include identifying the at least a portion of the multiple databases for which the monitoring data indicates the event and one or more characteristics of the monitoring data corresponding to the event. The one or more characteristics can be represented, for example, using an extracted or calculated variable value based on the monitoring data. The one or more characteristics include indications and/or early warning signs indicating occurrence of the event (e.g., the need for additional resources or the adverse event). The one or more characteristics can include, for example, a number of connections, a duration of a spike and/or a period of degraded performance, query execution times, buffer cache statistics, wait events and/or statistics, a particular time period that tends to precede an event (e.g., a time of day, a day of the week, a day of the year/holiday/sales event, etc.), workload growth in a time period (e.g., a day, a week, a year, etc.), and so forth. The one or more characteristics can be extracted and/or calculated from various kinds of data, such as database logs, operating system logs, system swap memory/paging data, disk input/output error data, packet loss percent increase, archive/transaction logs, and so forth.

The process 400 proceeds to block 430, where the generated training dataset is used to train a machine learning model to detect events in monitoring data for databases. Once the machine learning model has been trained using the process 400, the trained machine learning model can receive monitoring data for a database and predict a likelihood that the database will experience an event within a specified time period in the future. For example, a machine learning model trained to predict adverse events can detect one or more anomalies in the monitoring data indicating a likelihood that the database will experience an outage, slow performance, or another adverse event. A machine learning model trained to predict a need to adjust resources for a database can predict that a database is likely to need a resource adjustment, such as an increase in processing capacity, memory, and/or storage. In some implementations, the machine learning model can predict multiple events that occur according to one or more patterns, such as resource adjustments occurring at regular or irregular time periods, resource adjustments corresponding to certain dates or times of the year, and so forth. In some implementations, the machine learning model can also recommend and/or cause performance of one or more actions to prevent or remedy a predicted event, such as adjusting a resource, disabling at least a portion of a database, preventing access to a database by one or more users, and so forth.

Predicting events using the trained machine learning model can include calculating one or more confidence scores reflecting a likelihood that the event will happen. If a calculated confidence score exceeds a threshold score (e.g., 80%, 90%, 95%, etc.) then the system determines that the event is likely to occur. If the predicted event is associated with a corresponding action (e.g., to prevent or remedy the event, to adjust resource, etc.) then the system can cause the action to be performed.

In some implementations, the process 400 includes evaluating the trained machine learning model using a testing dataset. For example, a portion of the training dataset (e.g., 10%) generated at block 420 can be held back as testing data to be used to evaluate the trained machine learning model. The trained machine learning is applied to the test data to evaluate accuracy of the trained machine learning model. In some implementations, the trained machine learning model is evaluated periodically (e.g., daily, weekly, monthly, quarterly, yearly, etc.) and/or as needed to determine whether the accuracy of the model exceeds a threshold accuracy (e.g., 80%, 90%, 95%, etc.).

If the accuracy of the model does not exceed the threshold accuracy then the model can be retrained. Retraining the machine learning model can include training the machine learning model at least a second time using the same training dataset, training the machine learning model with a different (e.g., expanded) training dataset, applying different weightings to a training dataset, rebalancing a training dataset, and so forth. Through retraining, the model can be made more accurate, such as to correct for variances between expected outcomes and actual outcomes (e.g., incorrectly predicting events) and/or to correct for model drift (e.g., degradation in model performance over time due to a change in environment, data patterns, assumptions underlying a model, etc.). Various techniques can be used to train and/or retrain the machine learning model. For example, adaptive boosting can be used, which is an iterative process that runs multiple tests on a collection of training data. Adaptive boosting transforms a weak learning algorithm (e.g., an algorithm that performs at a level only slightly better than chance) into a strong learning algorithm (an algorithm that displays a low error rate, e.g., below a threshold error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting can use, for example, weak classifiers that are single-split trees with only two leaf nodes.

People skilled in the art will appreciate that operations can be added to and/or removed from the processes 300 and 400 without deviating from the teachings of the present disclosure. Additionally or alternatively, operations of processes 300 and 400 can be performed in a different order, including performing two or more operations in parallel.

Computer System

Figure 5:
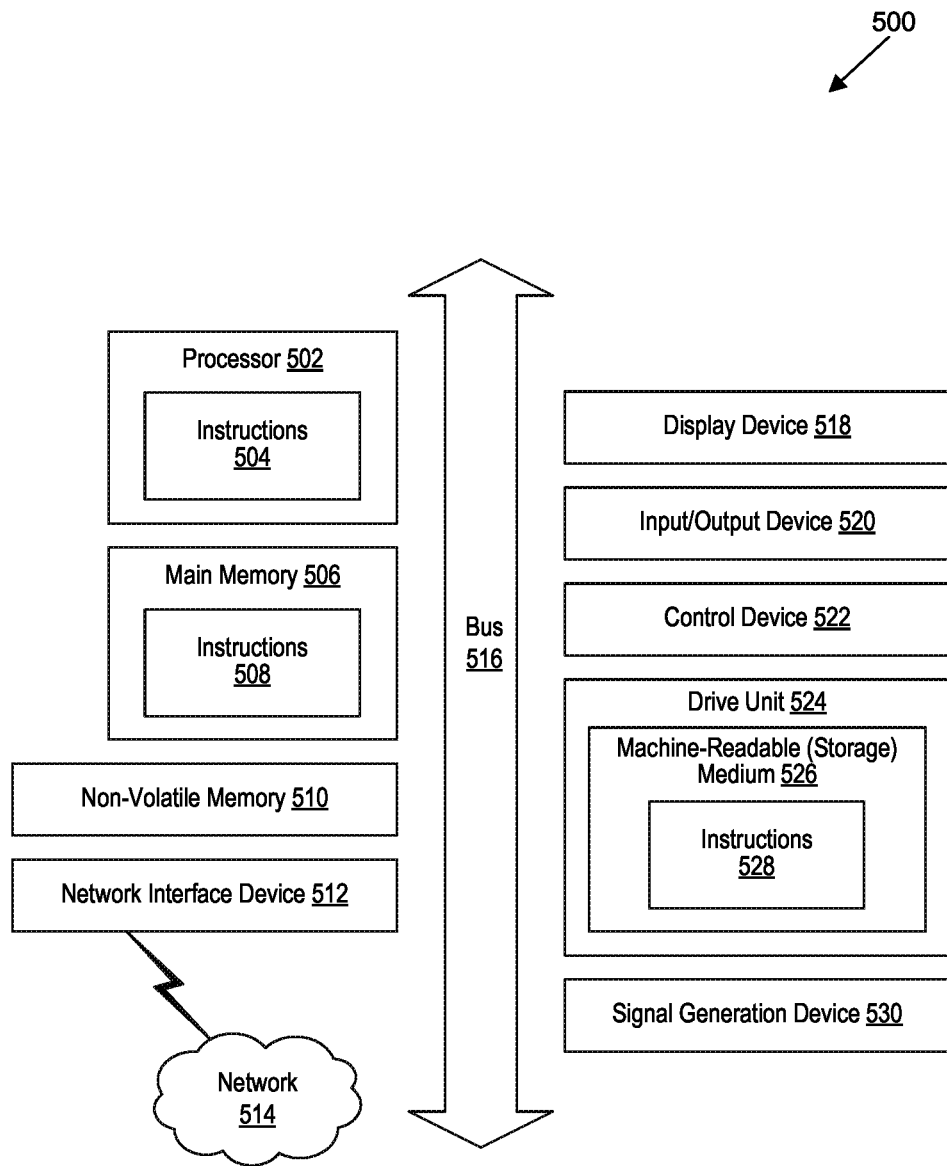
FIG. 5 is a block diagram that illustrates an example of a computing system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Figure 6:
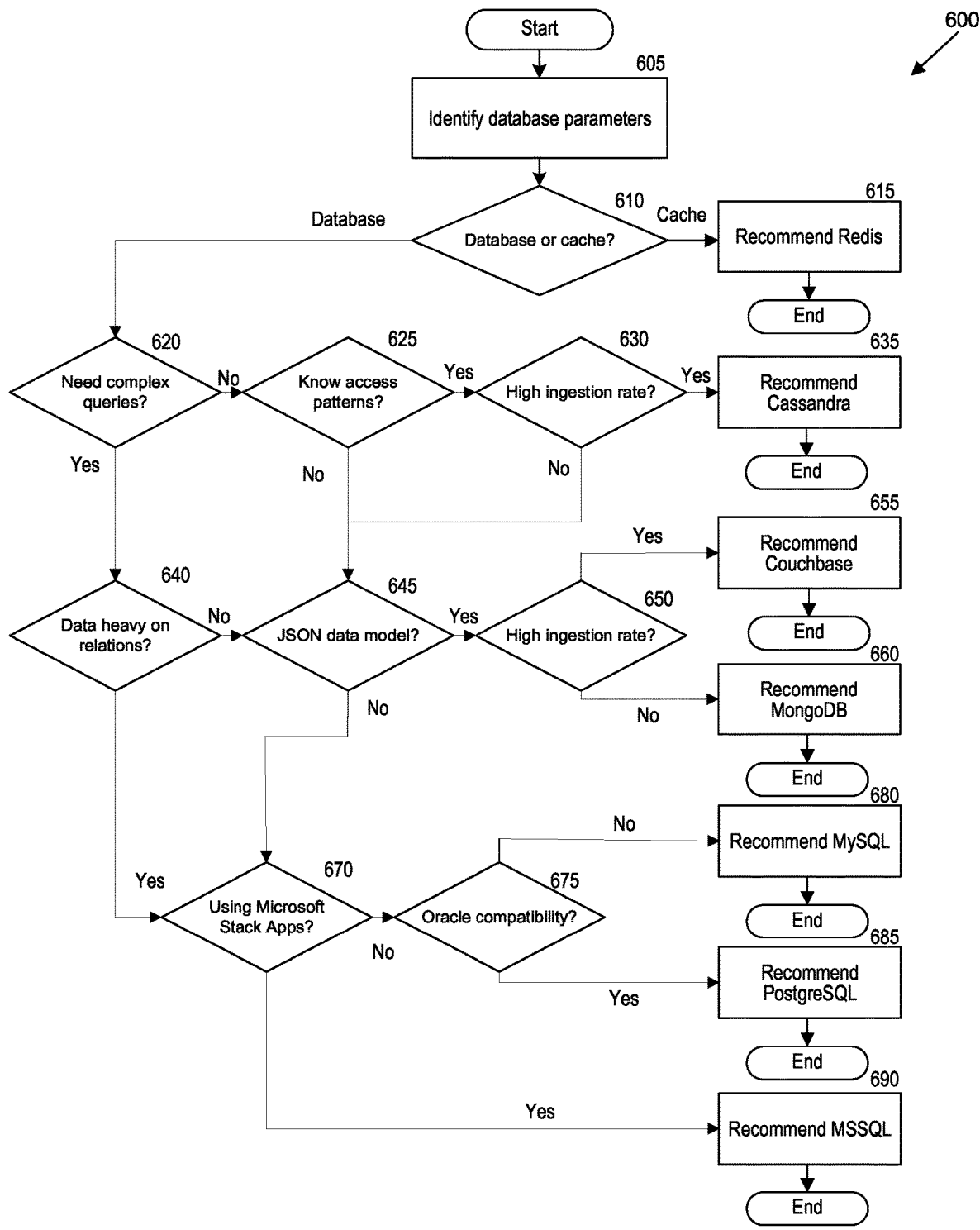
FIG. 6 is a flow diagram that illustrates a process for generating database recommendations using a database provisioning and management system in some implementations.

FIG. 6 is a flow diagram that illustrates a process 600 for generating database recommendations using a database provisioning and management system in some implementations. At least a portion of the process 600 can be performed, for example, as a part of block 320 of the process 300 of FIG. 3.

For purposes of illustration, the process 600 depicts recommendations for specific database types of Redis, Cassandra, Couchbase, MongoDB, MySQL, PostgreSQL, or MSSQL. However, these illustrative recommendations are non-limiting, and a person skilled in the art will appreciate that other specific database types can be used. Additionally, in some implementations, a greater or lesser number of specific database types can be used while maintaining a similar functionality. In these and other limitations, the process 600 illustrates how the disclosed system considers various parameters before generating recommendations for different specific database types based on capabilities of each specific database type. A person skilled in the art will appreciate that different specific database types can be used while maintaining a similar functionality and based on capabilities of specific database types.

The process 600 begins at block 605, where database parameters are identified. The database parameters can be received, for example, in a database provisioning request received at block 310 of the process 300 of FIG. 3. The parameters include a general database type, an application that will be associated with the database, and an initial size for the database. The parameters can also include other parameters, as described herein. Additionally or alternatively, if one or more parameters are not specified in the provisioning request, then a default parameter value can be assumed and/or a parameter value can be extrapolated based on other parameters.

The process 600 proceeds to decision block 610, where it is determined whether a database or cache is needed. This can be determined based on a database type specified in a provisioning request and/or one or more other parameters, such as an expected duration of storage. For example, if persistent storage is not needed, then it is determined that a database is not necessary.

If, at block 610, a cache is determined to be recommended and/or persistent storage is not found to be necessary, then the process 600 proceeds to block 615 where a Redis database is recommended. This recommendation can then be displayed to a user, together with any additional recommendations, such as a recommended amount of storage, memory and/or processing resources, a recommended environment, a recommended location, and so forth.

If, at block 610, a database is determined not to be recommended, then the process 600 proceeds to decision block 620, where it is determined whether complex queries will need to be supported. For example, complex queries can be used to retrieve complex data from multiple tables. Other examples of complex queries include queries associated with joins, relations (e.g., within or across databases), secondary indexes, aggregations, and so forth.

If, at block 620, support for complex queries is not required, then the process 600 proceeds to block 625, where it is determined whether database access patterns are known. For example queries generated by an application will likely be associated with known access patterns because the queries will be predefined, and the developer will consider access patterns during development.

If, at block 625, access patterns are determined to be known, then the process 600 proceeds to block 630 where it is determined whether a high ingestion rate is required or expected (e.g., when an application is heavy on writes and/or requires scale-out architecture). If a high ingestion rate is required or expected, then the process 600 proceeds to block 635, where a Cassandra database is recommended. This recommendation can then be displayed to a user, together with any additional recommendations, such as a recommended amount of storage, memory and/or processing resources, a recommended environment, a recommended location, and so forth.

Returning to block 620, if it is determined that support for complex queries is needed, then the process 600 proceeds to block 640, where it is determined whether data that will be stored in the database will be heavy on relations. For example, highly structured data may require relations between tables.

The process 600 proceeds to block 645 when any of the following conditions apply: access patterns at block 625 are determined not to be known, a high ingestion rate at block 630 is found not to be required, or data is determined not to be heavy on relations at block 640. At block 645, it is determined whether data associated with the database will follow a JSON (e.g., document) model with no dependencies/relations to other sets of data being stored. This data can be structured or semi-structured.

If, at block 645, it is determined that the data will follow a JSON data model, then the process 600 proceeds to block 650, where it is determined whether a high ingestion rate is required.

If, at block 650, it is determined that a high ingestion rate is required, then the process 600 proceeds to block 650, where a Couchbase database is recommended. This recommendation can then be displayed to a user, together with any additional recommendations, such as a recommended amount of storage, memory and/or processing resources, a recommended environment, a recommended location, and so forth.

If, at block 650, a high ingestion rate is determined not to be required, then the process 600 proceeds to block 660, where a MongoDB database is recommended. This recommendation can then be displayed to a user, together with any additional recommendations, such as a recommended amount of storage, memory and/or processing resources, a recommended environment, a recommended location, and so forth.

The process 600 proceeds to block 670 when either of the following two conditions apply: it is determined at block 640 that data will not be heavy on relations, or it is determined at block 645 that data will not follow a JSON model. At block 670, it is determined whether Microsoft Stack applications will be used. If it is determined that Microsoft Stack applications will not be used, then the process 600 proceeds to block 675, where it is determined whether Oracle compatibility is required, such as whether Oracle-compatible packages and/or dblinks will be used.

If at block 675, Oracle-compatible features are determined not to be required, then the process 600 proceeds to block 680, where a MySQL database is recommended. This recommendation can then be displayed to a user, together with any additional recommendations, such as a recommended amount of storage, memory and/or processing resources, a recommended environment, a recommended location, and so forth.

If at block 675, Oracle-compatible features are determined to be required, then the process 600 proceeds to block 685, where a PostgreSQL database is recommended. This recommendation can then be displayed to a user, together with any additional recommendations, such as a recommended amount of storage, memory and/or processing resources, a recommended environment, a recommended location, and so forth.

Returning to block 670, if it is determined that Microsoft Stack applications will be used, then the process 600 proceeds to block 690, where a MSSQL database is recommended. This recommendation can then be displayed to a user, together with any additional recommendations, such as a recommended amount of storage, memory and/or processing resources, a recommended environment, a recommended location, and so forth.

A person skilled in the art will appreciate that operations included in the process 600 can be added and/or omitted while maintaining a similar functionality. For example, additional and/or alternative specific database types can be recommended and/or fewer specific database types can be recommended. Additionally, operations in process 600 can be performed in any order, including performing operations in parallel and/or repeating one or more operations.

In some implementations, all operations of the process 600 can be performed automatically based on parameters identified at block 605. In these and other implementations, one or more operations in the process 600 can include generating a question or prompt for a user. For example, if parameters identified at block 605 are insufficient to make a determination at any of the decision blocks 610, 620-630, 640-650, and/or 670-675, then the process 600 can include requesting that a user provide one or more additional parameters to make the determination. The request can be displayed in a user interface, and the user can provide the one or more additional parameters in various ways, such as by selected from a predetermined set of options, providing a string as an input, responding to yes/no questions, and so forth.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computing system to train a machine learning model to predict an adverse event associated with a database, the computing system comprising:
    at least one processor; and
    at least one non-transitory memory carrying instructions that, when executed by the at least one processor, cause the computing system to perform operations comprising:

receiving monitoring data for multiple database systems,
  wherein the monitoring data includes historical performance data and usage data for each of the multiple database systems during a time period,
  wherein the historical performance data includes buffer cache statistics or wait event statistics,
  wherein the usage data includes two or more of: a threshold amount of reads from new or unknown users, a threshold amount of reads during a predetermined time period, or database access from an out-of-range IP address, and
  wherein the monitoring data includes, for at least some of the multiple database systems, data associated with an adverse event during which a feature or function of the database system experienced an outage or failure;
generating, using the monitoring data for the multiple database systems, a training dataset,
  wherein at least a portion of the monitoring data is analyzed for an indication corresponding to the adverse event, and
  wherein the indication corresponding to the adverse event includes a spike in transactions, a number of connections, or a query execution time; and
  wherein the training dataset includes data related to actions taken in response to the adverse event; and
training, using the generated training dataset, a machine learning model to predict adverse events in database systems for future monitoring data comprising performance data and usage data; and
  wherein training the machine learning model includes training the model to assign a confidence score based on a likelihood the predicted adverse events will occur, and
  wherein performance of an action to remedy or prevent the adverse events occurs when the confidence score exceeds a threshold score.

2. The computing system of claim 1:
wherein at least some of the monitoring data used in the training dataset includes actions corresponding to the adverse events, the actions comprising at least one of adjusting a resource for a database, disabling at least a portion of a database, preventing access by a user to a database, or generating a notification of the adverse event; and
wherein training the machine learning model includes training the machine learning model to cause performance of an action corresponding to an adverse event.

3. The computing system of claim 2, wherein the operations further comprise:
applying the trained machine learning model to predict an adverse event associated with a database and cause performance of an action based on the predicted adverse event.

4. The computing system of claim 1, wherein the operations further comprise:
applying the trained machine learning model to predict an adverse event associated with a database.

5. The computing system of claim 1, wherein the operations further comprise:
evaluating the trained machine learning model using a testing dataset,
  wherein the testing dataset includes monitoring data for multiple databases, and
  wherein monitoring data for at least some of the multiple databases included in the testing dataset includes monitoring data associated with an adverse event; and
retraining the machine learning model when accuracy of the machine learning model does not exceed a threshold accuracy,
  wherein retraining the machine learning model includes at least one of: training the machine learning model at least a second time using the generated training dataset, resampling at least a portion of the generated training dataset, or training the machine learning model using a different dataset.

6. At least one computer-readable medium, excluding transitory signals, and carrying instructions that, when executed by a computing system, cause the computing system to perform operations to train a machine learning model to predict an event associated with a database, the operations comprising:
receiving monitoring data for multiple database systems,
  wherein the monitoring data includes historical performance data and usage data for each of the multiple database systems during a time period,
  wherein historical performance data includes buffer cache statistics or wait event statistics,
  wherein usage data includes two or more of: a threshold amount of reads from new or unknown users, a threshold amount of reads during the time period, or database access from an out-of-range IP address, and
  wherein the monitoring data includes, for at least some of the multiple database systems, data associated with an event associated with the database system;
generating, using the monitoring data for the multiple database systems, a training dataset,
  wherein at least a portion of the monitoring data is analyzed for an indication corresponding to the event, and
  wherein the indication corresponding to the adverse event includes a spike in transactions, a number of connections, or a query execution time; and
  wherein the training dataset includes data related to actions taken in response to the adverse event; and
training, using the generated training dataset, a machine learning model to predict adverse events in database systems for future monitoring data comprising performance data and usage data; and
  wherein training the machine learning model includes training the model to assign a confidence score based on a likelihood the predicted adverse events will occur, and
  wherein performance of an action to remedy or prevent the adverse events occurs when the confidence score exceeds a threshold score.

7. The at least one computer-readable medium of claim 6, wherein the event includes an adverse event during which at least a portion of a database experienced an outage or failure.

8. The at least one computer-readable medium of claim 6, wherein the event includes an adjustment of at least one resource for a database, the at least one resource including a storage capacity, a processing capacity, or both.

9. The at least one computer-readable medium of claim 6:
wherein at least some of the monitoring data includes actions corresponding to events, the actions comprising at least one of adjusting a resource for a database, disabling at least a portion of a database, preventing access by a user to a database, or generating a notification of the event; and wherein training the machine learning model includes training the machine learning model to cause performance of an action corresponding to an event.

10. The at least one computer-readable medium of claim 9, wherein the operations further comprise:

applying the trained machine learning model to predict an event associated with a database and cause performance of an action based on the predicted event.

11. The at least one computer-readable medium of claim 6, wherein the operations further comprise:

applying the trained machine learning model to predict an event associated with a database,
wherein predicting the event is based on detecting a pattern of multiple events.

12. The at least one computer-readable medium of claim 6, wherein the operations further comprise:

evaluating the trained machine learning model using a testing dataset,
wherein the testing dataset includes monitoring data for multiple databases, and
wherein monitoring data for at least some of the multiple databases included in the testing dataset includes monitoring data associated with an event; and retraining the machine learning model when accuracy of the machine learning model does not exceed a threshold accuracy,
wherein retraining the machine learning model includes at least one of: training the machine learning model at least a second time using the generated training dataset, resampling at least a portion of the generated training dataset, or training the machine learning model using a different dataset.

13. At least one computer-readable medium, excluding transitory signals, and carrying instructions that, when executed by a computing system, cause the computing system to perform operations to deploy one or more databases for a software application based on one or more database recommendations, the operations comprising:

receiving a database provisioning request for a software application,
wherein the database provisioning request includes a general database type, software code for the software application to be deployed on the database, and at least one parameter of the one or more databases, and
wherein the at least one parameter relates to at least one of the software application requested to be deployed by the database provisioning request, a type of data to be hosted by the database, or an amount of data to be hosted by the database;

generating a set of database recommendations using the database provisioning request to deploy the software application on the database,
wherein each database recommendation in the set of database recommendations includes a specific type of database and at least one of an amount of memory, an amount of storage, or a processing capacity;

receiving a selection of a database to be provisioned to deploy the software application from the set of generated database recommendations;

receiving an approval to provision the selected database to deploy the software application, wherein the approval is based on a quota or a privilege associated with a user associated with the database provisioning request;

generating the selected database to deploy the software application,
wherein software code to generate the selected database is retrieved from a repository;

storing a representation of the generated database in an inventory of databases to facilitate management of the generated database; and compiling a report, using a monitoring agent, to notify a user about at least two of:
system utilization, capacity trending, errors, or availability,
wherein the monitoring agent captures data related to the generated database.

14. The at least one computer-readable medium of claim 13, wherein the operations further comprise:

receiving monitoring data for the generated database; and
applying a trained machine learning model to predict, using the received monitoring data, an adverse event associated with the generated database,
wherein the adverse event relates to an outage or failure of at least one feature or function of the generated database.

15. The at least one computer-readable medium of claim 14, wherein the operations further comprise:

applying the trained machine learning model to perform at least one action to prevent or remedy the adverse event,
wherein the at least one action includes adjusting a resource for the generated database, disabling at least a portion of the generated database, preventing access by a user to the generated database, or generating a notification of the adverse event.

16. The at least one computer-readable medium of claim 13, wherein the operations further comprise:

receiving monitoring data for the generated database; and
applying a trained machine learning model to predict, using the received monitoring data, a need to adjust at least one resource for the generated database, the at least one resource including a storage capacity, a processing capacity, or both.

17. The at least one computer-readable medium of claim 16, wherein the operations further comprise:

causing an adjustment of the at least one resource based on the prediction.

18. The at least one computer-readable medium of claim 13, wherein each database recommendation in the set of database recommendations includes an availability or resiliency recommendation for the database and a deployment location or environment.

19. The at least one computer-readable medium of claim 13, wherein the operations further comprise:

receiving monitoring data for the generated database; and
generating, using the received monitoring data, a performance report for the generated database,
wherein the performance report includes at least one performance metric for the generated database.

20. The at least one computer-readable medium of claim 13, wherein the operations further comprise:

receiving a request to decommission the generated database;
decommissioning the generated database in response to the received request; and updating the inventory to reflect the decommissioning of the generated database.

* * * * *